(12) United States Patent
Raub et al.

(10) Patent No.: US 9,893,383 B2
(45) Date of Patent: Feb. 13, 2018

(54) ALKALI METAL HALIDE CELLS

(71) Applicant: EaglePicher Technologies, LLC, Joplin, MO (US)

(72) Inventors: Eric R. Raub, Carl Junction, MO (US); Larry A. Addington, Joplin, MO (US); James A. Degruson, Carl Junction, MO (US); Robert L. Higgins, Jr., Joplin, MO (US); Daniel L. Maxwell, Joplin, MO (US)

(73) Assignee: EAGLEPICHER TECHNOLOGIES, LLC, Joplin, MO (US)

( * ) Notice: Subject to any disclaimer, the term of this patent is extended or adjusted under 35 U.S.C. 154(b) by 0 days.

(21) Appl. No.: 14/656,669

(22) Filed: Mar. 12, 2015

(65) Prior Publication Data

US 2015/0263388 A1    Sep. 17, 2015

Related U.S. Application Data

(60) Provisional application No. 61/952,324, filed on Mar. 13, 2014.

(51) Int. Cl.
| | |
|---|---|
| *H01M 10/39* | (2006.01) |
| *H01M 2/02* | (2006.01) |
| *H01M 4/80* | (2006.01) |
| *H01M 4/58* | (2010.01) |
| *H01M 4/38* | (2006.01) |
| *H01M 2/30* | (2006.01) |

(52) U.S. Cl.
CPC ....... *H01M 10/399* (2013.01); *H01M 2/0255* (2013.01); *H01M 2/0265* (2013.01); *H01M 2/30* (2013.01); *H01M 4/381* (2013.01); *H01M 4/582* (2013.01); *H01M 4/808* (2013.01); *H01M 2300/0022* (2013.01); *H01M 2300/0074* (2013.01)

(58) Field of Classification Search
CPC .................................................. H01M 10/399
See application file for complete search history.

(56) References Cited

U.S. PATENT DOCUMENTS

| | | | |
|---|---|---|---|
| 3,765,945 A | 10/1973 | Sudworth | |
| 3,877,984 A | 4/1975 | Werth | |
| 3,901,733 A * | 8/1975 | Toy | H01M 10/3927 427/226 |

(Continued)

OTHER PUBLICATIONS

Jun. 19, 2015 International Search Report and Written Opinion of the International Searching Authority issued in International Patent Application No. PCT/US2015/020305.

(Continued)

*Primary Examiner* — Maria Laios
*Assistant Examiner* — Robert S Carrico
(74) *Attorney, Agent, or Firm* — Kenealy Vaidya LLP

(57) ABSTRACT

An improved alkali metal halide cell including an anode module having at least (i) one planar module including a porous assembly and (ii) that encloses an active anode material in an anode reservoir; and a cathode having active cathode material; where the porous assembly is coated with a thin ion-conducting layer that separates the active anode material enclosed within the anode module from the cathode material, and the anode and cathode are contained in a housing having one or more compartments.

27 Claims, 12 Drawing Sheets

(56) References Cited

U.S. PATENT DOCUMENTS

| | | | |
|---|---|---|---|
| 4,132,820 A | | 1/1979 | Mitoff |
| 5,035,963 A | | 7/1991 | Plichta et al. |
| 5,053,294 A | | 10/1991 | Sernka |
| 5,061,580 A | * | 10/1991 | Wedlake ................. B28B 1/002 264/618 |
| 5,112,703 A | | 5/1992 | Koenig |
| 8,178,231 B2 | | 5/2012 | Soloveichik |
| 8,652,689 B2 | | 2/2014 | Yerramalli et al. |
| 2010/0178532 A1 | * | 7/2010 | Shapiro ................... C03C 3/064 429/7 |
| 2011/0052968 A1 | * | 3/2011 | Venkataramani ... H01M 2/0252 429/158 |
| 2012/0040230 A1 | | 2/2012 | Sudworth |
| 2012/0088133 A1 | | 4/2012 | Lemmon et al. |
| 2012/0225345 A1 | | 9/2012 | Kim |
| 2013/0108912 A1 | | 5/2013 | Quek et al. |
| 2013/0337309 A1 | | 12/2013 | Virkar et al. |

OTHER PUBLICATIONS

David Trickett, 'Current Status of Health and Safety Issues of Sodium/Metal Chloride (Zebra) Batteries,' National Renewable Energy Laboratory, Nov. 1998.

* cited by examiner

Examples of Prismatic Configurations

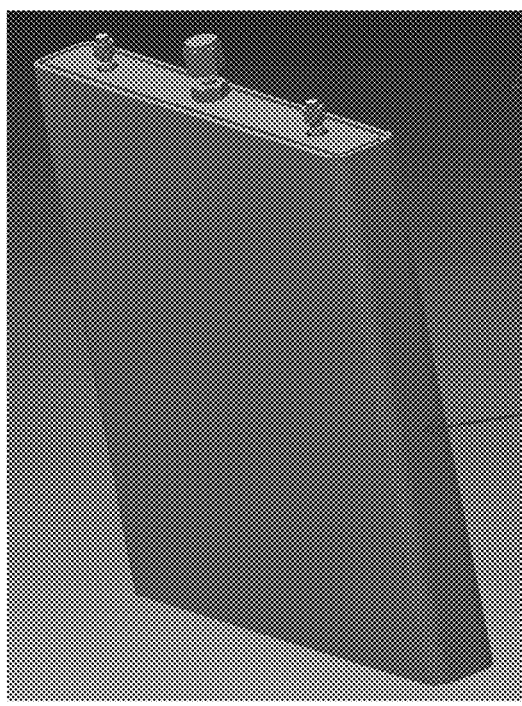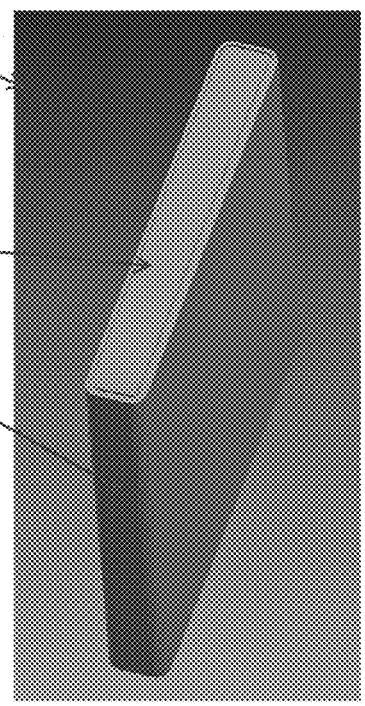
FIG. 7A: Top View  FIG. 7B: Bottom View
Single Bi-Cell

ALKALI METAL HALIDE CELLS

GOVERNMENT SUPPORT

This disclosed and claimed subject matter was made with Government support under ARPA-E DE-0000045 awarded by DOE. The Government has certain rights in the disclosed and claimed subject matter.

CROSS REFERENCE TO RELATED APPLICATION

This application is non provisional of U.S. Provisional Application No. 61/952,324, filed on Mar. 13, 2014, which is hereby incorporated in its entirety by reference.

TECHNICAL FIELD

The present disclosure generally relates to battery technology.

BACKGROUND

Alkali ion solid-state batteries, such as sodium metal halide batteries, are known and have been widely used in various applications. In a typical sodium metal halide battery, a solid-state electrolyte, such as β"-alumina solid electrolyte (BASE) or sodium super ion conductor (NASICON), is disposed between a molten sodium anode and a cathode, such as a metal halide (e.g., $NiCl_2$). During discharge, sodium atoms in the anode donate electrons and migrate through the electrolyte to the cathode. To properly function, the electrolyte must be a good conductor of sodium ions, be a poor conductor of electrons, physically separate the anode and cathode materials, and have sufficient structural integrity to withstand the harsh environmental conditions during operation. These solid electrolyte devices are usually operated at high temperatures (around 300° C.), and materials of the electrodes are highly corrosive and reactive at these temperatures.

The electrolyte is fabricated into tubes, discs, or other shapes from sodium-conducting ceramic materials, such as BASE or NASICON. Conventional designs for sodium metal halide cells generally use a round or clover-leaf shaped tubular geometry in individually packaged containers. In conventional sodium ion conducting solid-state electrolyte designs, the structural integrity of each cell electrolyte depends solely on the solid electrolyte material itself. The electrolyte must be sufficiently thick, and the ceramic be sufficiently strong for the electrolyte to be self-supporting and to maintain its physical integrity. Typically, thickness is at least 1 mm, usually between about 1 and 2 mm, and fabrication requires prolonged sintering and conversion steps at high temperatures. This design results in high costs of materials and processing. In this regard, it is desirable to utilize thinner electrolyte layers to reduce the impedance of the cell (which has the benefit of yielding higher energy storage capacities, higher power outputs, and less heat production during operation).

Tubular type designs typically include a series of cylinders or cells connected to one another. The shape of the tubular design results in a high resistance (i.e., lower efficiency), poor power and energy densities (due to the need for a thicker cathode and limited/small active surface area) compared to other stack designs (such as planar type designs) due to an increased travel distance of the ionic species. The tubular shape also makes connecting individual cells with one another difficult and results in a less compact multi-cell structure.

Alternative planar type stack designs have been used that may have a higher efficiency than tubular style designs possibly due to a shorter electron travel distance. However, conventional planar type stack designs use large glass or brazed seals placed between each of the layers of the stack which can create a high degree of shear loading. When operated in the vertical position, the seal surfaces are in direct contact with the electrochemically active components of the cell (i.e., the corrosive materials of the stack, such as a molten salt) making them prone to accelerated corrosion and thus subsequent failure.

Additionally, as conventional planar cells are scaled to higher capacity, the BASE becomes more likely to fail due to bending and residual thermal stress during component and cell manufacturing and operation. Such planar cells may include glassing the BASE to an alpha alumina ring for structural support. Constructing a fully dense alumina ring with the requisite flatness and roundness makes the technology cost uncompetitive. Furthermore, production costs are also increased by the fact that the coefficient of expansion of any metal packaging employed must be perfectly matched to the BASE to avoid cell breakage as a result of placing the seals under a shear load.

As can be seen, various attempts have been made to address the above issues with conventional alkali metal halide batteries. Known alkali metal halide batteries fail to adequately address the sealing and scaling issues discussed above, and present safety issues if the content of the alkali metal, such as sodium, is uncontrollably released to the cathode compartment. Accordingly, improved alkali metal halide batteries and components thereof are desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Thus, the present disclosure generally relates to battery technology. More particularly, the disclosure relates to metal halide batteries, such as sodium metal halide batteries including a planar module having a porous planar metal assembly (or "porous assembly") coated with an ion-conducting material, such as sodium β"-alumina, and to methods of forming and using the batteries.

In some embodiments there is provided an alkali metal halide cell, including an electrode having at least one planar module and further including an active material in a cavity of a reservoir, and an opposing electrode. In some embodiments, the anode and cathode may be included in a housing having one or more compartments and/or including one or more planar modules. For sake of clarity, the discussion herein is focused on a central anode system but could also be used in a central cathode configuration, and it is to be understood that the disclosed and claimed subject matter is intended to include and otherwise cover both such configurations.

DESCRIPTION OF THE FIGURES

The accompanying drawings, which are included to provide a further understanding of the subject matter and are incorporated in and constitute a part of this specification, illustrate embodiments of the subject matter and together with the description serve to explain the principles of the subject matter. In the drawings:

FIGS. 7A and 7B illustrate a single bi-cell;

DETAILED DESCRIPTION OF THE EMBODIMENTS

Figure 1:
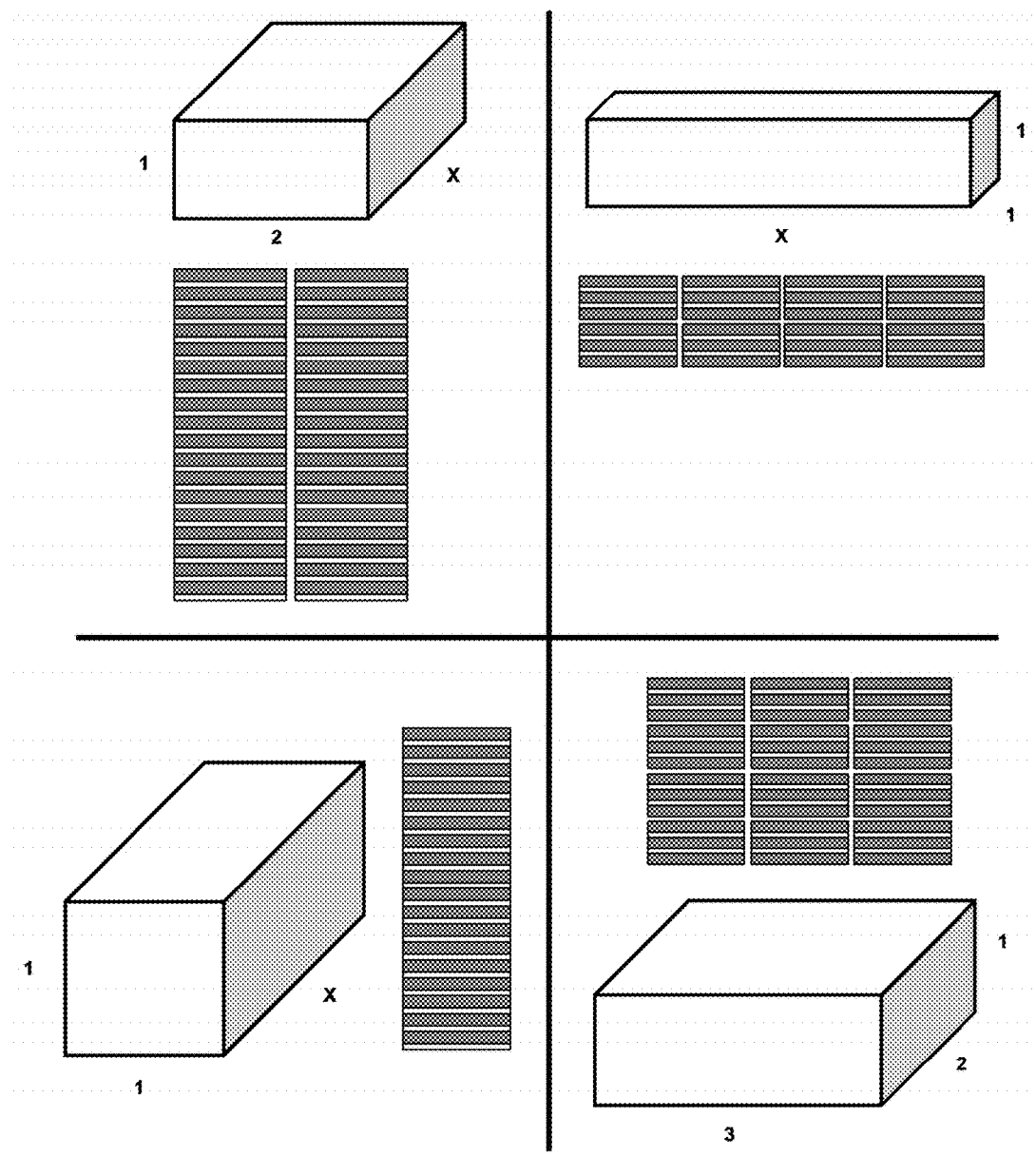
FIG. 1 illustrates examples of prismatic cell configurations and stacked cell arrangements.

In the following description, numerous details are set forth to provide an understanding of the present disclosure. However, it may be understood by those skilled in the art that the methods of the present disclosure may be practiced without these details and that numerous variations or modifications from the described embodiments may be possible.

When introducing elements of the present disclosure or the embodiments thereof, the articles "a", "an", "the" and "said" are intended to mean that there are one or more of the elements. The terms "comprising", "including" and "having" are intended to be inclusive and mean that there may be additional elements other than the listed elements.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also include some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

As used herein, the terms "anode" and "cathode" are used to describe the respective electrodes in a discharge or use operation of an energy storage device, battery or electrochemical cell. Energy storage devices, batteries or electrochemical cells in accordance with various embodiments of the present disclosure may also include current collectors, terminals, casings, and/or other components, which are not expressly illustrated in the present disclosure. Energy storage devices, batteries or electrochemical cells may be of any size or shape and may include one or more unit cells (such as bi-cells) according to the present disclosure.

As used herein, term "bi-cell" means a cell structure that includes at least one cell having one or more separator(s) interposed between electrodes having different polarities, wherein the outermost electrodes have the same polarity (e.g., a cathode/separator/anode/separator/cathode structure). Unless otherwise stated, the term "bi-cell" as used in the present disclosure means a cell with one anode, two cathodes (the cathodes being positioned on opposite sides of the anode (where the anode may be included in an anode module)) and a separator interposed between electrodes having different polarities.

In the present disclosure, an energy storage device (or alkali metal halide cell) may otherwise be referred to herein as an electrochemical cell, battery, a capacitor, a cell, an electrochemical device, or the like. It should be understood that any cell that involves electron transfer between an electrode and an electrolyte is contemplated to be within the scope of the term energy storage device as used in the present disclosure. The energy storage devices of the present disclosure may be made in a variety configurations (and sizes) in any desirable manner known to those skilled in the art.

The present disclosure provides an improved energy storage device, such as an improved alkali metal halide energy storage device (or alkali metal halide cell) or sodium metal halide energy storage device (sodium metal halide cell), and methods of forming the energy storage device. For example, an energy storage device is provided that includes a housing (or case), a cathode, an anode module including a planar module having a porous planar metal assembly coated with an ion-conducting layer made up of a solid electrolyte material and an anode active material (such as an alkali metal (e.g., sodium, lithium, potassium, rubidium, cesium, or francium), and current collectors. Embodiments can also or alternatively include a cathode module that includes a planar module and a cathode active material, such as transition metal halides (e.g., $NiCl_2$, $FeCl_2$ and others). In embodiments, the planar module may be a metal assembly formed by welding sheets of metal, such as rectangular sheets of sintered metal, or rectangular sheets of sintered metal foam, on both sides of a metal ring (such as a rectangular metal ring) made of stainless steel, nickel, or controlled-expansion nickel alloy. Other embodiments are envisioned in which the planar module includes a planar assembly made of a material other than metal, such as a polymer or organometallic material, suitable for use in an energy storage device.

In general, the energy storage devices of the present disclosure can exhibit increased capacity while minimizing packaging, and minimizing the seal area compared to traditional batteries, such as traditional sodium metal halide batteries. Additionally, in some embodiments, the seals of the energy storage devices of the present disclosure are not in direct contact with the corrosive materials, such as a sodium tetrachloroaluminate melt. In such embodiments, for example a sodium-resistant glass or, alternatively, a boron nitride seal can be used.

In some embodiments, the energy storage devices of the present disclosure may be configured to include a stacked cell arrangement, illustrated in FIG. 1, such as a stacked bi-cell arrangement, which allows for the production of larger capacity cells of various prismatic shapes, such as those depicted below where the energy storage devices of the present disclosure may contain more than one bi-cell (in FIG. 1, a single bi-cell is identified below as a single solid rectangular shape).

For example, as illustrated in FIG. 1, a housing having a prismatic shape, for example, one of those set forth above may have an internal volume that may contain multiple individual cells and/or bi-cells (as described above) that can be stacked in any desired manner (including those illustrated above) to create an energy storage device or cell with higher capacity. In the above-illustrated energy storage devices (or alkali metal halide cells) "X" is 18 (upper-left and right and lower-left). In some embodiment, an energy storage device (or alkali metal halide cell) including a battery stack or a stack configuration of cells, such as bi-cells (where each bi-cell contains an anode module, such as a planar anode module), may be designed such that "X" in the above illustration is any desired integer, such as an integer in a range of from about 1 to about 200, such as about 2 to about 100, or about 5 to about 80, or about 10 to about 50. In such embodiments, housing having a prismatic shape (or case) includes inward facing surface defining a first region including at least one planar anode module (discussed below) disposed within the first region. In embodiments, the first region may have any desired volume, such as a volume in a range of from about 200 $cm^3$ to about 90,000 $cm^3$, or a volume in a range of from about 800 $cm^3$ to about 15,000 $cm^3$, or a volume in a range of from about 400 $cm^3$ to about 60,000 $cm^3$. In some embodiments, the housing (or case) may have one or more compartments, such as from about 2 to about 10 compartments, or from about 4 to about 8 compartments (and each compartment may include a battery stack or a stack configuration of cells, such as bi-cells).

In embodiments in which sodium (and/or another alkali metal) is contained in the anode of an energy storage device including at least two anode modules, safety may be enhanced because the sodium (and/or another alkali metal) is distributed/stored (equally or substantially equally—i.e., less than 1% variation by weight) in multiple anode modules. Thus, a breach in a single anode module (containing sodium and/or another alkali) would reduce and/or slow the exotherm associated with, for example, sodium reacting with another component (such as sodium tetrachloroaluminate to produce aluminum and sodium chloride). Accordingly, the energy storage devices of the present disclosure are relatively safe compared to other alkali metal halide battery technologies, such as conventional sodium metal halide battery technologies having a single sodium reservoir, wherein a breach of the reservoir may result in a rapid and complete release of the anode alkali metal into the volume occupied by the cathode and secondary electrolyte.

Furthermore, glass seals may be used in the energy storage device design of the present disclosure. In the energy storage devices of the present disclosure, such seals are mainly under a compression force, and not a shear force, which results in a reduction in the possibility of failure due to cracking/breaking. This concept allows for easier scale-up to large capacity cells based on smaller easier to manufacture parts. In embodiments, a double sided anode arrangement/structure may improve the cells impedance. In conventional planar mono-cell approach a 0.4 inch thick cathode and 150 $cm^2$ BASE may be employed. In this approach, two cathodes 0.2 inch thick would be paired to an anode module with 300 $cm^2$ of BASE surface area. The stacked bi-cell approach allows for large capacity cells to be built with less packaging materials.

In embodiments, an energy storage device is provided that includes a cathode, and an anode including an anode module containing an anode active material (such as sodium), and a current collector. The cathode and the anode active material are separated from each other by an ion conducting layer that coats the planar module and provides a path for ion transfer from the interior (i.e., the anode reservoir) of the anode module to the region of the energy storage device containing the cathode (and cathode active material). In some embodiments, the ion conducting and separating layer that coats the planar module may have a thickness in a range of from about 10 µm to about 500 µm, such as from about 100 µm to about 350 µm, or a thickness in a range of from about 0.05% to about 6.8% of the total thickness of the anode module, such as a thickness in a range of from about 0.08% to about 3.7% of the total thickness of the anode module.

In some embodiments, the energy storage device of the present disclosure may be an alkali metal halide battery, such as a sodium metal halide battery, with one or more battery stacks, such as a battery stack including at least two bi-cells, or at least five bi-cells, or at least ten bi-cells. The alkali metal halide battery, such as a sodium metal halide battery, may include a cathode, and anode including an anode module containing a planar module and an anode active material, and a current collector, the cathode and the anode active material being separated from each other by an ion conducting layer that coats the planar module and provides a path for ion transfer from the interior (i.e., the anode reservoir) of the anode module to the region of the energy storage device containing the cathode (and cathode active material). The ion conducting layer may have any desired thickness, such as a thickness in a range of from about 10 µm to about 500 µm, or from about 100 µm to about 350 µm. In some embodiments, ion conducting separator layer (making up the outermost surface of the anode module) may have an average thickness in a range of from about 0.05% to about 6.8% of the average thickness of the anode module (relative to the total thickness (average) of the anode module), such as an average thickness in a range of from about 0.08% to about 3.7% of the average thickness of the anode module (relative to the total thickness (average) of the anode module).

In embodiments, an energy storage device is provided that includes a housing (or case) having an inward facing surface defining a first region including at least one anode module disposed within the first region. In some embodiments, the anode module may have a thickness a range of from about 2 mm to about 50 mm, or a thickness a range of from about 10 mm to about 30 mm, or a thickness a range of from about 15 mm to about 25 mm.

In embodiments, the first region may have any desired volume, such as a volume in a range of from about 200 cm$^3$ to about 90,000 cm$^3$, or a volume in a range of from about 800 cm$^3$ to about 15,000 cm$^3$, or a volume in a range of from about 400 cm$^3$ to about 60,000 cm$^3$. In some embodiments, the housing (or case) may have one or more compartments, such as from about 2 to about 10 compartments or from about 4 to about 8 compartments. Such an energy storage device may include at least one anode module disposed within the first region (and/or one or more compartments thereof), the at least one anode module including an assembly that encloses an active anode material, such as an alkali metal (e.g., sodium, lithium, potassium, rubidium, cesium, or francium), in an anode reservoir. In other words, the anode module may have an inward facing surface defining the anode reservoir, which includes the anode active material, such as an alkali metal (e.g., sodium, lithium, potassium, rubidium, cesium, or francium).

In some embodiments, the cathode material may be any suitable cathode material, and the cathode material may include about 50% to about 99.99% active cathode material by weight based on the weight of the cathode, or the cathode material may include about 60% to about 99% active cathode material by weight based on the weight of the cathode, or the cathode material may include about 80% to about 98% active cathode material by weight based on the weight of the cathode.

The coating of the metal assembly of the planar module may be an ion-conducting layer (or ion-conducting separator, which may simply be referred as a "separator") that provides a path for ion transfer from, for example, the interior (i.e., the anode reservoir) of the anode module to the region of the energy storage device containing the cathode (and cathode active material). Such an ion-conducting layer or separator may be made from any ion-conducting or electrolyte material that is suitable for use in environment typically experienced by alkali metal halide batteries, such as sodium β"-alumina. The separator may have any desired thickness, such as a thickness in a range of from about 10 μm to about 500 μm, or from about 100 μm to about 350 μm. In some embodiments, the one or more planar anode module(s) may be configured to be incorporated into a unit cell, such as a bi-cell that is incorporated into a battery stack. Each battery stack may include one or more unit cells. The unit cell may also be selected from various other structures known in the art.

Alternative forms or configurations of the disclosed energy storage device may also be utilized and can be selected from those known in the art. For example, as an alternative to a bi-cell configuration, the form or configuration of the energy storage device may be a case-negative design or "reverse configuration," wherein the components (cathode, anode, β" alumina separator, and electrolyte) are enclosed in a conductive metal casing such that the casing may be connected to the anode current collector in a case-negative configuration, although case-neutral design may also be suitable. A material for the casing may be any suitable material, such as, for example, titanium, stainless steel, nickel, and aluminum. The casing (or casing header) may include a metallic lid having a sufficient number of openings to accommodate the glass-to-metal seal/terminal pin feed through for the cathode electrode. In some embodiments, the anode electrode may be connected to the housing (or case). An additional opening may be provided for electrolyte filling. The casing header may include elements that are compatible with the other components of the electrochemical cell and is resistant to corrosion. The cell may thereafter be filled with the electrolyte and hermetically sealed (as described below), such as by welding a stainless steel plug over the fill hole or crimping and welding the fill tube 200 illustrated in FIG. 2. The cell may alternatively be constructed in a case-positive design.

The number of anode modules (and/or the number of bi-cells) included in the energy storage device (such as the first region of the energy storage device and/or one or more compartments of the first region of the energy device) is not particularly limited. In some embodiments, two or more bi-cells (where each bi-cell contains an anode module) may be included, for example, in the first region, where the two or more bi-cells are arranged in a stack configuration (also referred to as a "battery stack"). A battery stack or a stack configuration of bi-cells (where each bi-cell contains an anode module, such as a planar anode module) included in the first region and/or one or more compartments of the first region of the energy device of the present disclosure may contain, for example, from about 2 to about 200 bi-cells, such as about 5 to about 100 bi-cells, or about 10 to about 50 bi-cells.

In such embodiments, each battery stack may operate as one energy source and may include a terminal or contact of positive potential and a terminal or contact of negative potential.

The bi-cell structure included in the energy storage device of the present disclosure may have a structure of cathode/separator/anode/separator/cathode, where the anode includes an anode active material that is contained in an anode module. In such a configuration, the anode module containing the anode active material may be separated from each of the cathodes by an ion conducting separator layer that coats the planar module and provides a path for ion transfer from the interior of the anode module (i.e., the anode reservoir) to the region of the energy storage device containing the cathode (and cathode active material). In such embodiments, the ion conducting separator layer (making up the surface of the anode module) may have a thickness in a range of from about 10 μm to about 500 μm, such as from about 80 μm to about 400 μm, or from about 100 μm to about 350 μm.

The number of bi-cells contained in an energy storage device (or a battery stack in one or more compartment thereof) of the present disclosure is not particularly limited. In some embodiments, the total number of bi-cells contained in an energy storage device of the present disclosure (such as in a battery stack or otherwise) may be in a range of from about 2 to about 200, such as about 5 to about 100, or about 10 to about 50.

Figure 2:
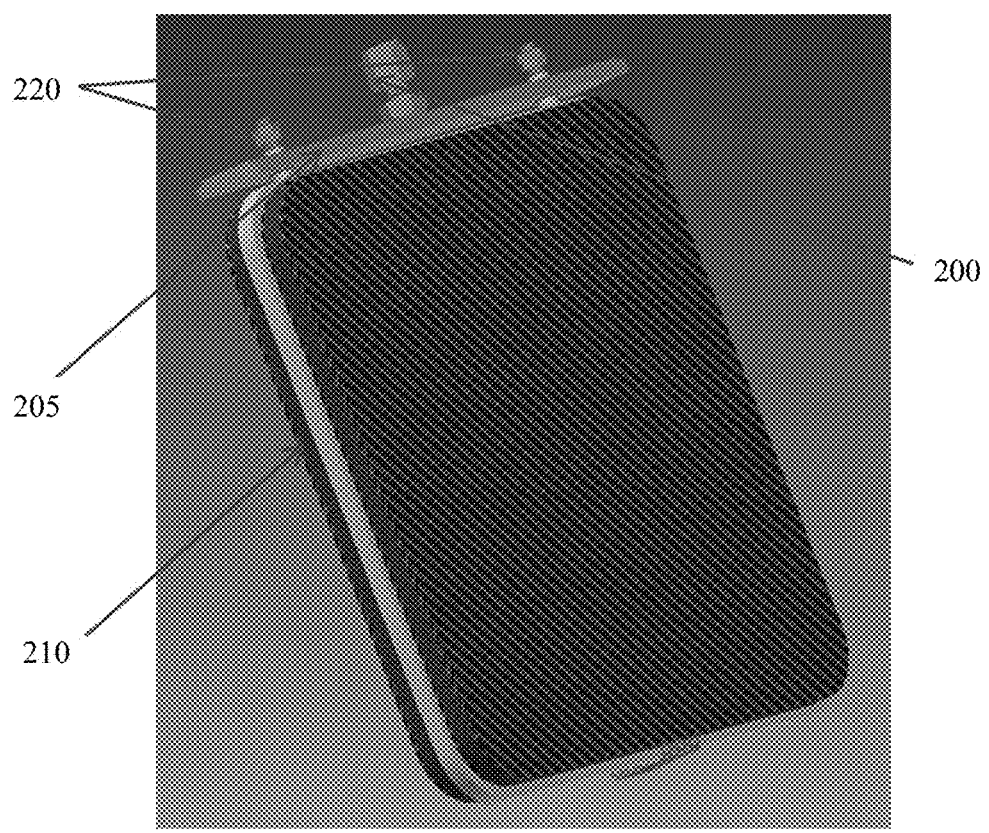
FIG. 2 illustrates a bi-cell that can be incorporated within an energy storage device of the present disclosure.
Figure 3:
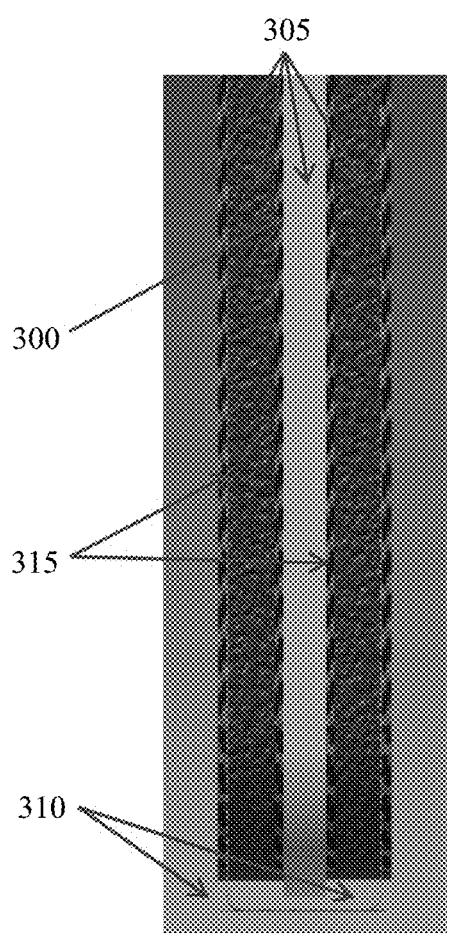
FIG. 3 illustrates a bi-cell that can be incorporated within an energy storage device of the present disclosure.

In some embodiments, a bi-cell to be incorporated within an energy storage device of the present disclosure may have features as illustrated in FIGS. 2 and 3.

FIG. 2 provides an illustration of an embodiment in which the metal lid 205 and anode module 210 may be welded to (e.g., the top of) a housing (or case) of an energy storage device (not shown). In some embodiments, the terminal pins 220 of an anode module may be glassed into the metal lid, such as via a sodium resistant glass such as SCHOTT G018-402 or similar. Other embodiments include mechanical seal designs using a boron nitride sealing insert. In embodiments, the terminal pins may be made of a controlled expansion nickel iron alloy (e.g., Kovar™ Invar™, or alloy 52). The terminal pins may be of any suitable dimensions, such as a diameter in a range of from about 0.1 inch to about 0.5 inch, or from about 0.125 inch to about 0.375 inch, and may be of any appropriate length, such a length that allows the terminal pin to extend above the frame about 0.5 inch to about 2 inches, or about 0.75 inch to about 1.5 inches.

Figure 4:
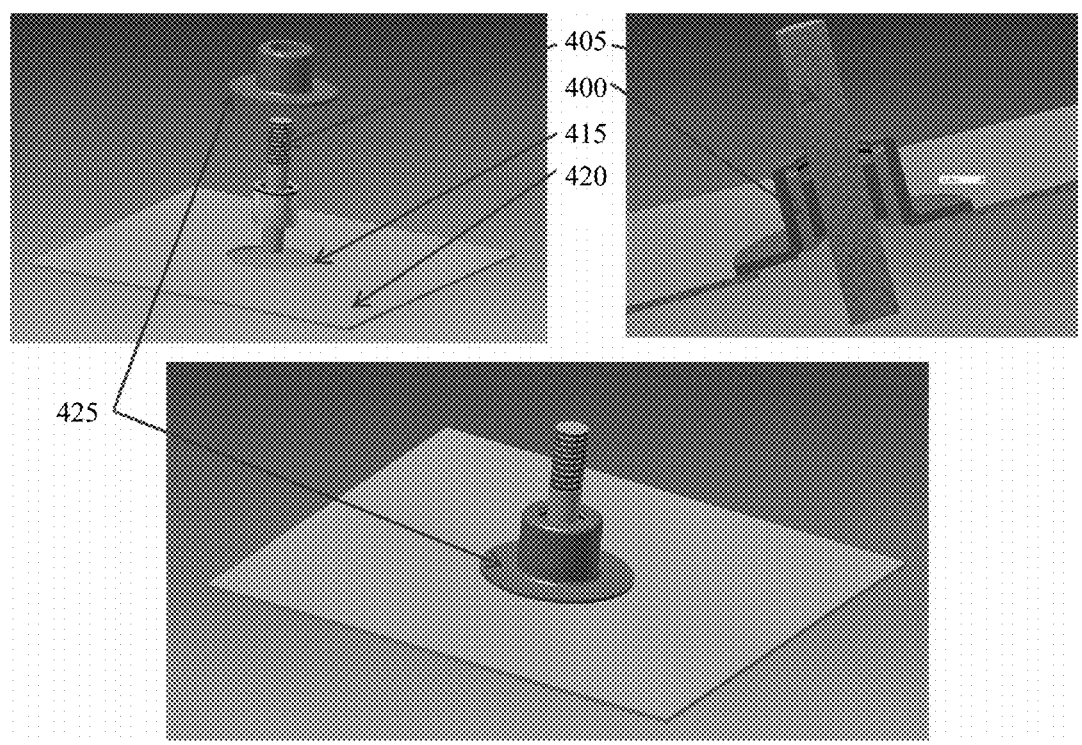
FIG. 4 illustrates a method for constructing an electrical feed-through and showing alternative options for threaded and unthreaded terminals.

In some embodiments, the energy storage device, such as an alkali metal halide energy storage device (or alkali metal halide cell) or sodium metal halide energy storage device (or sodium metal halide cell), of the present disclosure may be formed in a manner that includes installing the anode modules by a suitable method, such as, for example, to glass a header 400 onto the anode module terminal pin 405, as depicted in FIG. 4 which illustrates a method for constructing an electrical feed-through and showing alternative options for threaded and unthreaded terminals.

In such embodiments, the header may then slide through a hole 415 (of a suitable size) in the lid 420. A metal hood 425 would drop over the terminal pin, and the hood would be welded at the header and lid. The advantage of the second method is the entire cell case and lid does not have to be put into an oven for glassing. The only item that needs to go through the glassing oven is the anode module. Other embodiments include mechanical seals between the terminal pins of the anode module and the cell's lid or hood.

Figure 12:
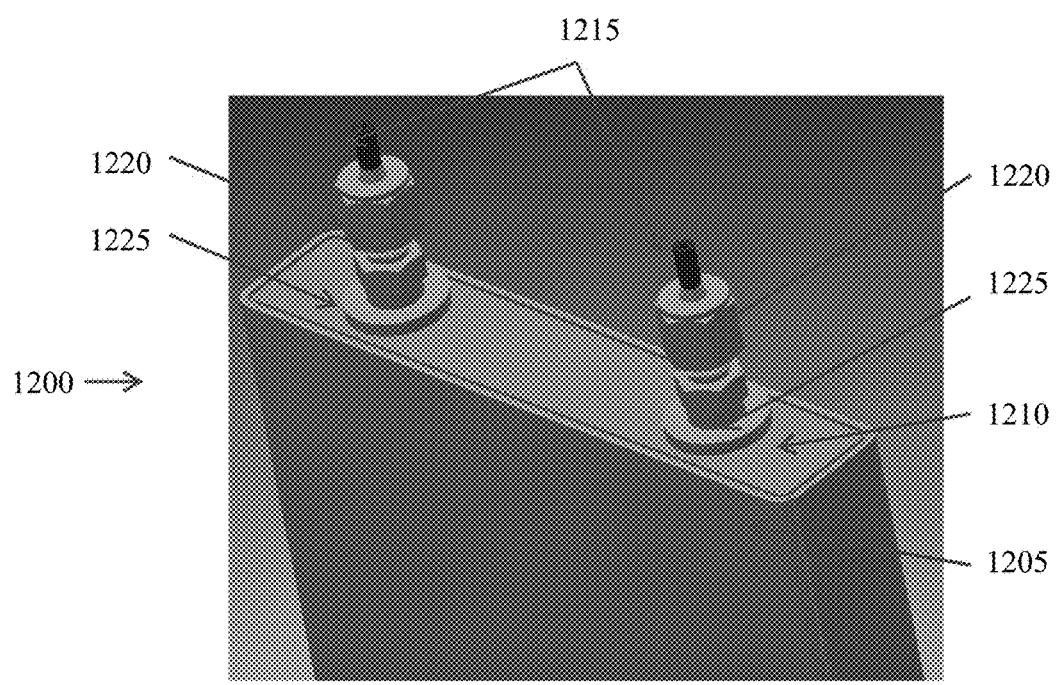
FIG. 12 illustrates a single bi-cell energy storage device.

As shown in FIG. 12, the mechanical seal would be achieved using a corrosion-resistant, crushable insert such as boron nitride. FIG. 12, illustrates a single bi-cell energy storage device having a container 1205, a lid 1210, one or more anode module terminal pins 1215, one or more compression fittings 1220 for the boron nitride inserts (the inserts are not visible in this representation), and a weld ring 1225 to facilitate welding the fitting to the lid 1210.

This embodiment avoids thermal cycling of the anode module during cell manufacturing. Methods for forming such seals are described in U.S. Pat. No. 5,678,832, which is incorporated herein by reference in its entirety.

In some embodiments, such as illustrated in FIG. 3, the bi-cell included in an energy storage device of the present disclosure may have a structure including an anode module, 300, one or more pieces of felt (or similar functioning material) 305, one or more current collectors 310, and two cathode disks 315, such as a pressed cathode plate (i.e., a carrier/container configured to hold and transport a plurality of pellets of the cathode material such that the integrity of the pellets is maintained (e.g., no chipping, breaking, degradation due to humidity and/or the like; methods for forming such plates are described in U.S. Patent Application Publication No. 2011/0072651, which is hereby incorporated by reference in its entirety)), which may be installed via any suitable manner on opposite sides of the anode module.

In embodiments, the cathode plate may be made of a combination of nickel powder, sodium chloride, and conventional additives along with pore former (for example, either ammonium carbonate, ammonium bicarbonate, or sized sodium tetrachloroaluminate). The nickel powder, sodium chloride, and additives may be agglomerated to assist with proper blending with the pore former. The cathode may then be directly pressed into a puck using the pore former and powders/granulate. In some embodiments, the majority of pores may be within a range of from about 0.5 µm to about 500 µm, or about 1 µm to about 350 µm, or about 5 µm to about 200 µm.

The energy storage device of the present disclosure may further include an ionically conductive secondary electrolyte, which serves as (or aids in the formation of) a path for migration of ions between the anode and the cathode during electrochemical reactions of the cell. The secondary electrolyte may be in either liquid state or solid state, or both. The electrochemical reaction at the electrodes involves conversions of ions in atomic or molecular forms that migrate from the anode to the cathode. In some embodiments, a secondary electrolyte may be selected such that it exhibit physical properties that are beneficial for ionic transport. The various components of the electrolyte may be selected from among those generally known in the art, which are suitable for use in combination with the selected anode and cathode materials.

In some embodiments, the cathode that is disposed on opposite sides of the anode module may be a solid, electronically conductive or active porous or particulate material, and may include a transition metal halide, TX, wherein T is a transition metal, for example Ni, Fe, Cr, Co, Mn, Cu, and mixtures of two or more thereof, and X is a halide, for example Cl, F, Br, or I. In some embodiments, the cathode may be wrapped in a thin felt to act as a wick. The felt may be made of any suitable material, such as, for example, carbon, alumina, or zirconia fiber and may have an average thickness in a range of from about 0.1 mm to about 4 mm, or about 0.5 mm to about 3.0 mm, or about 0.75 mm to about 1.5 mm.

The secondary electrolyte may be included in the region of the energy storage device containing the cathode. The secondary electrolyte may be, for example, a molten salt liquid electrolyte having the formula MAlX, wherein M is an alkali metal (e.g., sodium, lithium, potassium, rubidium, cesium, or francium; consistent with that present in the electrode), Al is aluminum, and X is the same halide contained in the active electrode material, and is present in the positive electrode to transmit ions (such as sodium ions) between the reaction sites in the positive electrode and the ion conducting separator (such as sodium β"-alumina). The secondary electrolyte may be included in any suitable amount. In some embodiments, the cathode may include a transition metal halide, TX, of $NiCl_2$. In such embodiment, M is Na, T is Ni, and X is Cl, such that the active electrode material is $NiCl_2$, and the molten salt liquid electrolyte is $NaAlCl_4$.

In embodiments, the bi-cell may contain cathode collector leads placed at any suitable location on the bi-cell. For example, the cathode collector leads may be placed at the end of the bi-cell that is opposite to the end to which the terminal pins are located. In some embodiments, the cathode collector leads may be welded to the housing or case of the energy storage device.

Figure 5:
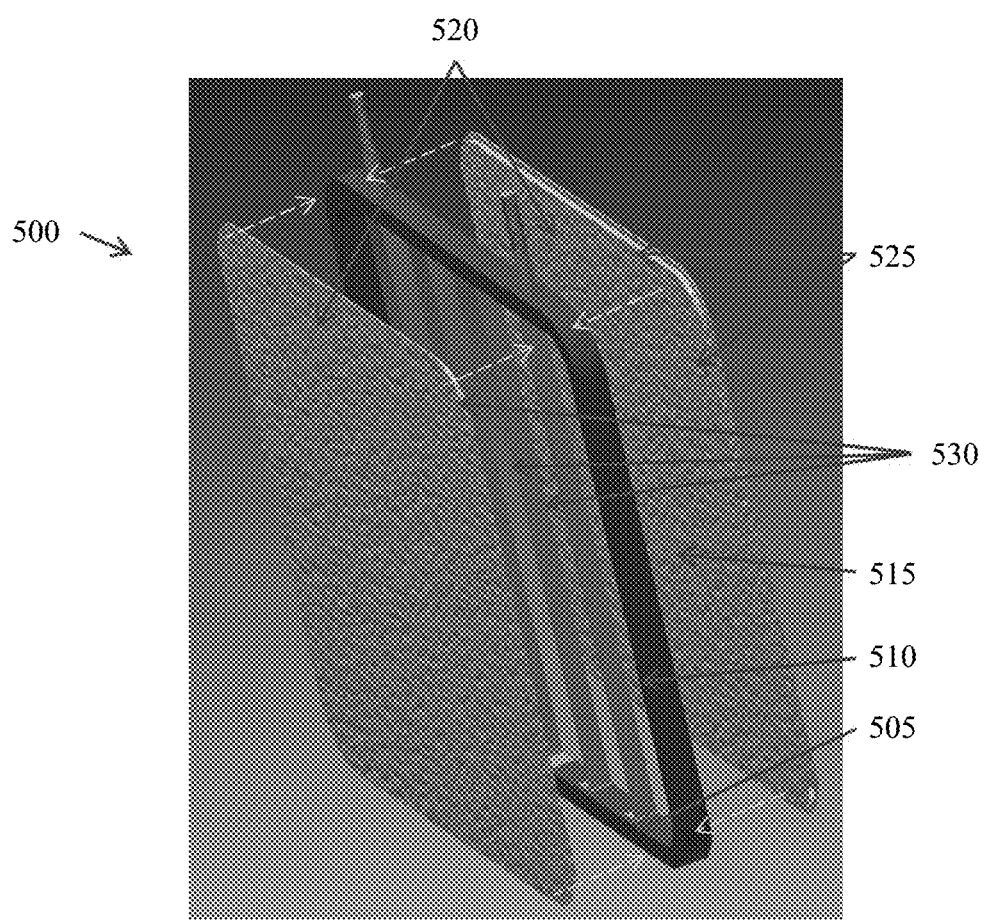
FIG. 5 illustrates an anode reservoir.

The bi-cell may also include an anode reservoir, such as a sodium reservoir (as illustrated in FIG. 5), which, in some embodiments, may be formed by welding sheets of a suitable material of a predetermined shape, such as rectangular sheets of sintered metal foam, on both sides of a metal ring, such as a rectangular metal ring as depicted in FIG. 5.

In FIG. 5, the inner surface 505 of the rectangular metal ring 510 (which may optionally include one or more stainless steel supports 530) and the inner surface 515 of the rectangular sheets (or sintered pieces) 520 (welded to the rectangular metal ring) define the anode reservoir 500, which may be, for example, a sodium reservoir as shown in FIG. 5.

The rectangular sheets (or sintered pieces) 520 may be made by any desired processing, such as, for example, by cutting out the sintered piece by using a steel rule die or laser cutter. In some embodiments, the edge 525 of the metal sinter may be crushed (or "coined") to create flat uniform surface for the weld bead. Additionally, if desired, a fixture may be used to hold the sinter in place while a laser welder puts down the weld bead.

In embodiments, the volume of the cavity defining the anode reservoir (i.e., the volume of an individual anode reservoir, such as individual anode reservoir within a single planar anode module) is in a range of from about 5 cm$^3$ to about 2,700 cm$^3$, such as about 10 cm$^3$ to about 1,200 cm$^3$, or about 20 cm$^3$ to about 33,750 cm$^3$. In some embodiments, the total (aggregate) volume of all anode reservoirs in the energy storage device may be equal to the values above multiplied by the number of anode reservoirs present in the energy storage device (which, for example, may be in a range of from about 2 to about 200 anode reservoirs, such as about 5 to about 100 anode reservoirs, or about 10 to about 50 anode reservoirs).

In embodiments, the surface area of the anode reservoir (i.e., the surface area of an individual anode reservoir, the total aggregate surface area of all anode reservoirs in the energy storage device being the values below multiplied by the number of anode reservoirs present, which, may be in a range of from about 2 to about 200 anode reservoirs, such as about 5 to about 100 anode reservoirs, or about 10 to about 50 anode reservoirs) may be in a range of from about 50 cm$^2$ to about 1,800 cm$^2$, such as about 200 cm$^2$ to about 450 cm$^2$, or about 110 cm$^2$ to about 800 cm$^2$.

In some embodiments, the total anode reservoir volume (i.e., total aggregate volume of all anode reservoirs in the energy storage device) may be in a range of from about 5 cm$^3$ to about 540,000 cm$^3$, such as a volume in a range of from about 10 cm$^3$ to about 120,000 cm$^3$, or a volume in a range of from about 20 cm$^3$ to about 33,750 cm$^3$. In some other embodiments, the total anode reservoir volume (i.e., total aggregate volume of all anode reservoirs in the energy storage device) may be in a range of from about 4,000 cm$^3$ to about 540,000 cm$^3$, or about 6,000 cm$^3$ to about 120,000 cm$^3$. In some other embodiments, the total anode reservoir volume (i.e., total aggregate volume of all anode reservoirs in the energy storage device) may be in a range of from about 50 cm$^3$ to about 25,000 cm$^3$, such as a volume in a range of from about 125 cm$^3$ to about 4,500 cm$^3$, or a volume in a range of from about 150 cm$^3$ to about 13,500 cm$^3$.

In some embodiments, an individual anode reservoir (such as an individual anode reservoir of a single bi-cell) contained in the energy storage device of the present disclosure may contain from about 0.1% to about 50% by weight of the total anode active material (such as sodium) contained in the energy storage device, such as from about 0.5% to about 10% by weight of the total anode active material (such as sodium) contained in the energy storage device, or from about 1% to about 4% by weight of the total anode active material (such as sodium) contained in the energy storage device.

The metal ring of the planar module may be made of any suitable conductive material (e.g., such that the coefficient of thermal expansion value of the ion-conducting layer matches the coefficient of thermal expansion values of the planar module (or frame) material over the range of operating temperatures) able to withstand the conditions under which the energy storage device is intended to be manufactured, operated, stored, and/or used. Such materials include, for example, stainless steel, nickel, titanium, molybdenum or a controlled-expansion alloy, such as a controlled-expansion nickel alloy.

In embodiments, the metal ring may be selected to have any desired dimensions, such as an inside length ranging from, for example, about 5 cm to about 30 cm, or about 10 cm to about 15 cm or about 7.5 cm to about 20 cm; an inside height ranging from, for example, about 5 cm to about 30 cm, or about 10 cm to about 15 cm, or about 7.5 cm to about 20 cm; a width ranging from, for example, about 0.1 cm to about 2 cm, or about 0.2 cm to about 1.3 cm, or about 0.3 cm to about 0.7 cm; and a thickness ranging from, for example, about 0.2 cm to about 3 cm, or about 0.3 cm to about 2 cm, or about 0.5 cm to about 1.25 cm.

The sheets (such as porous sheets) to be sealed to the metal ring may be made of any suitable material and may have any suitable dimensions (consistent with the metal ring to which they are to be sealed to) and porosity. In embodiments, suitable sheets may include different shapes and/or materials, for example, metal sheets, such as rectangular sheets of sintered metal, or round or rectangular sheets of sintered metal foam, or such sheets may be selected to have any desired dimensions that allow the sheets of metal to be sealed to the metal ring to form a metal assembly containing an anode reservoir of the desired dimensions.

In some embodiments, the porous sheets to be sealed to the metal ring may be made of a material having a porosity in a range of from about 20% to about 97%, such as from about 25% to about 60%, or about 30% to about 55%, and an average pore diameter in a range of from about 0.5 µm to about 590 µm, such as from about 1 µm to about 75 µm, or from about 5 µm to about 40 µm.

The porous sheets which are sealed to the metal ring (e.g., sheets of metal, rectangular sheets of sintered metal, or rectangular sheets of sintered metal foam) to form the porous assembly may be selected to have any suitable thickness (e.g., the shortest dimension of a rectangular sheet), width (e.g., the next largest dimension of a rectangular sheet) and length (e.g., the largest dimension of a rectangular sheet). In some embodiments, the sheets to be welded to the metal ring to form the porous assembly may have a thickness ranging from, for example, about 0.03 mm to about 3.5 mm, or about 0.06 mm to about 0.5 mm, or about 0.1 mm to about 0.4 mm; a width ranging from, for example, about 5 cm to about 30 cm, or about 7.5 cm to about 20 cm, or about 10 cm to about 15 cm; and a length ranging from, for example, about 5 cm to about 30 cm, or about 7.5 cm to about 20 cm, or about 10 cm to about 15 cm.

Suitable materials for forming the porous sheets to be sealed to the metal ring may include any of the following (alone, or in any combination): electrically conducting powders, nanomaterials (e.g. carbon nanotubes (CNT), nanometals), various powders (including metals, sintered metals, metal oxides, carbon blacks, and/or graphite), or any other coarse or fine powdered material that may be pressed, sandwiched, adhered, or sintered together (optionally with suitable catalysts) by known methods to make a structurally sound, electrically conductive, porous structure. This may include pressing or sintering of any conductive material such as carbon black, activated carbon or graphite powder into an already formed, substrate made of either sintered metal foam, pressed metal powder, pressed metal oxide powder, porous ceramic, or any other porous, conducting material. For example, carbon black (or other suitable conductors) may be pressed into foamed metal, expanded metals, or pressed, sintered metal powders. Additionally, suitable catalyst materials may be added to the carbon prior to pressing into the metal. Suitable metals mentioned above may include, for example, aluminum, stainless steel, mild steel, bronze, nickel, nickel based alloys, titanium, copper or precious metals.

The ion-conducting layer of the planar module may include any solid electrolyte material such as sodium β"-alumina, deposited by any suitable method, such as, for example, via plasma spray deposition, CVD, PVD processes, or a combination thereof. For the embodiment of the plasma spray deposition, the ionic conducting material may be supplied as an agglomerated and conditioned dry material or as a slurry, depending upon the chosen particle size distribution of the feed material and coating application equipment. The ion-conducting layer provides a path for ion transfer from the interior (i.e., the anode reservoir) of the anode module to the region of the energy storage device containing the cathode (and cathode active material). Examples of suitable materials for such a coating may include alkali-metal-beta- and β"-alumina, gallate polycrystalline ceramics, and NASICON type materials (such as $Na_3Zr_2Si_2PO_{12}$), for example, described in U.S. Pat. Application No. 2013/0337309, which is hereby incorporated by reference in its entirety. Methodology and further suitable materials for coating the assembly are disclosed in U.S. Pat. No. 6,632,763, which is hereby incorporated by reference in its entirety. For example, suitable sodium ion conducting ceramic materials for the thin ion-conducting layer provided on the assembly may include β"-$Al_2O_3$ or (β"-alumina or), which is an isomorphic form of aluminum oxide ($Al_2O_3$), a hard polycrystalline ceramic, which may be complexed with a mobile ion, such as $Na^+$, $K^+$, $Li^+$, $Ag^+$, $H^+$, $Pb^{2+}$, $Sr^{2+}$ or $Ba^{2+}$ depending on the application. In some embodiments, the thin ion-conducting layer may be composed of β"-$Al_2O_3$ ($Na_2O(5\sim7)Al_2O_3$) with a rhombohedral crystal structure (R3m) including alternating closely-packed slabs of $Al_2O_3$ and layers with mobile sodium ions. In some embodiments, the ion-conducting ceramic may include a composite of the aforementioned materials or other materials with suitable conductive structural integrity and imperviousness, including those described in U.S. Pat. No. 5,154,987, which is hereby incorporated by reference in its entirety.

In embodiments, the ion-conducting layer, such as a sodium β"-alumina layer, making up the outer surface of the planar module may have a porosity that only allows ions (such as ions of the anode active material and/or cathode active material) to migrate across the ion-conducting layer and have a thickness sufficient to form a "defect-free" or substantially "defect-free" separator layer, such as an average thickness in a range of from about 60 μm to about 400 μm, such as from about 80 μm to about 160 μm, or from about 100 μm to about 150 μm, or from about 110 μm to about 130 μm.

The term "defect-free" refers, for example, to an ion-conducting layer containing no pinholes, pores, gaps (that permeate or span the entire thickness of the ion-conducting layer) and/or continuous gaps/openings/pathways of a size that would allow molten anode material, and/or molten secondary electrolyte to pass through the ion-conducting layer. The term "substantially defect-free" refers to pinholes, pores, gaps and/or continuous gaps/openings/pathways of approximately the same size as those described as "defect-free."

In some embodiments, the surface area of the ion-conducting layer that coats the porous assembly (i.e., the surface area of the ion-conducting layer on an individual porous assembly (the individual porous assembly having an inner surface that defines the anode reservoir) may be in a range of from about 50 $cm^2$ to about 1,800 $cm^2$, such as in a range of from 110 $cm^2$ to about 800 $cm^2$, or in a range of from 200 $cm^2$ to about 450 $cm^2$.

In some embodiments, the total ion-conducting layer surface area, such as the total ion-conducting layer surface area calculated by adding the separator surface area from each porous assembly present within the energy storage device, may be in a range of from 100 $cm^2$ to about 360,000 $cm^2$, such as in a range of from 1,000 $cm^2$ to about 45,000 $cm^2$, or in a range of from 3,000 $cm^2$ to about 22,500 $cm^2$.

In embodiments, an anode module may be formed by coating the outer surface of a porous assembly (e.g., formed by sealing the above-described sheets, such as rectangular sheets of sintered metal foam, to a metal ring, such as a rectangular metal ring) with a "defect-free" or substantially "defect-free" ion-conducting layer, such as a "defect-free" or substantially "defect-free" ion conducting sodium β"-alumina layer having an average thickness within the above described ranges. The defect free or substantially "defect-free" ion-conducting layer provides a path for ion transfer from the interior (i.e., the anode reservoir) of the anode module to the region of the energy storage device containing the cathode (and cathode active material), but otherwise may not allow anode materials to contact the cathode materials.

Any suitable ion-conducting materials such as, for example, a BASE ion-conducting layer (including β"-alumina), may be used as the coating covering the porous assembly provided that the coating provides a path for ion transfer from the interior (i.e., the anode reservoir) of the anode module to the region of the energy storage device containing the cathode (and cathode active material) and effectively separates the anode active materials from the cathode active materials. As noted above, this coated porous assembly, such as a coated metal assembly, may be part of an anode or cathode module.

In some embodiments, the metal ring of the porous assembly may also be entirely or partially coated with a ion-conducting material, such as an alumina material like sodium β"-alumina, deposited using PVD, CVD, or plasma electrolytic oxidation techniques or applied by suspension plasma spray or solution precursor plasma spray, or enameled with a sodium resistant glass. In such embodiments, the coating of the metal ring may occur before any ion-conducting material is deposited on the metal ring and/or metal assembly.

In embodiments, the outer surface of the metal assembly (e.g., formed by welding the above-described sheets to a metal ring) may be coated with an ion-conducting layer, such as sodium β"-alumina, having a thickness in a range of from about 60 μm to about 500 μm, or from about 100 μm to about 300 μm, or from about 80 μm to about 200 μm, where the average thickness of the ion-conducting separator layer is in a range of from about 60 μm to about 200 μm, such as from about 80 μm to about 160 μm, or from about 100 μm to about 150 μm, or from about 110 μm to about 130 μm.

Figure 6:
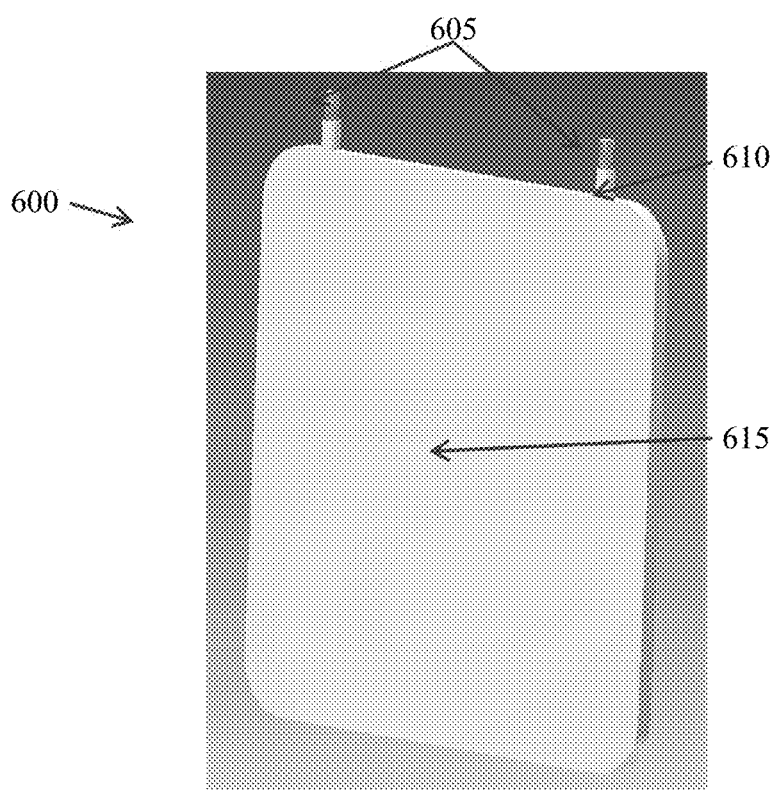
FIG. 6 illustrates a completed anode module.

In some embodiments, partially threaded terminal pins 605 may be welded into the top of the metal ring 610, and the outer surface of the metal assembly may coated with a ion-conducting layer 615, such as sodium β"-alumina, to form an anode module 600, as illustrated in FIG. 6.

An anode module may be made to have any desired dimensions. For example, the anode module may be prepared to have any desired thickness (e.g., the shortest dimension of the anode module), width (e.g., the next largest dimension of the anode module) and length (e.g., the largest dimension of the anode module), such as a thickness ranging from, for example, about 0.2 cm to about 3.0 cm, or about 0.3 cm to about 2.0 cm, or about 0.5 cm to about 1.25 cm; a width ranging from, for example, about 5.0 cm to about 30 cm, or about 7.5 cm to about 20 cm, or about 10 cm to about 15 cm; and a length ranging from, for example, about 5.0 cm to about 30 cm, or about 7.5 cm to about 20 cm, or about 10 cm to about 15 cm.

In some embodiments, one or both terminal pins of the anode module may be hollow to allow for sodium wetting agents to be deposited on the foam after application of the ion-conducting layer and/or to allow for purging of gas from the anode reservoir.

In embodiments, an anode module, e.g., the anode module (as illustrated in FIG. 6), may be included in a bi-cell (as illustrated in FIG. 2 and FIG. 3) and introduced into an energy storage device. Such a bi-cell included in an energy storage device of the present disclosure may be selected to have any desired dimensions. For example, the bi-cell may be prepared to have any desired thickness (e.g., the shortest dimension of the bi-cell), width (e.g., the next largest dimension of the bi-cell) and length (e.g., the largest dimension of the bi-cell) that allows the bi-cell to function in its intended capacity as an energy storage device, such as an average thickness ranging from, for example, about 0.5 cm to about 5 cm, or about 1 cm to about 3 cm, or about 1.5 cm to about 2.5 cm; an average width ranging from, for example, about 5 cm to about 30 cm, or about 7.5 cm to about 20 cm, or about 10 cm to about 15 cm; and an average length ranging from, for example, about 5 cm to about 30 cm, or about 7.5 cm to about 20 cm, or about 10 cm to about 15 cm.

The number of bi-cells contained in an energy storage device (or one or more compartments of an energy storage device) of the present disclosure is not particularly limited. For example, in some embodiments the energy storage devices of the present disclosure may contain a single bi-cell 700, as illustrated in FIG. 7A (top view) and FIG. 7B (bottom view), which depict a single bi-cell energy storage cell or device 700. Such a device includes a housing 710, a cathode 315 (in FIG. 3), and an anode 300 (in FIG. 3) including an anode module (as described above) coated with an ion-conducting layer (as described above). The cathode collector leads 310 (in FIG. 3) may be welded together and to the case by known methods. The bottom lid 730 is installed on the housing or container 710 and welded in place, as shown in FIG. 7A (top view) and FIG. 7B (bottom view).

The housing (or case) of the energy devices of the present disclosure is not limited to the shape set forth in the figures, and may have any shape conforming to the dimensions of the individual bi-cell (or battery stack including multiple bi-cells).

Figure 8A:
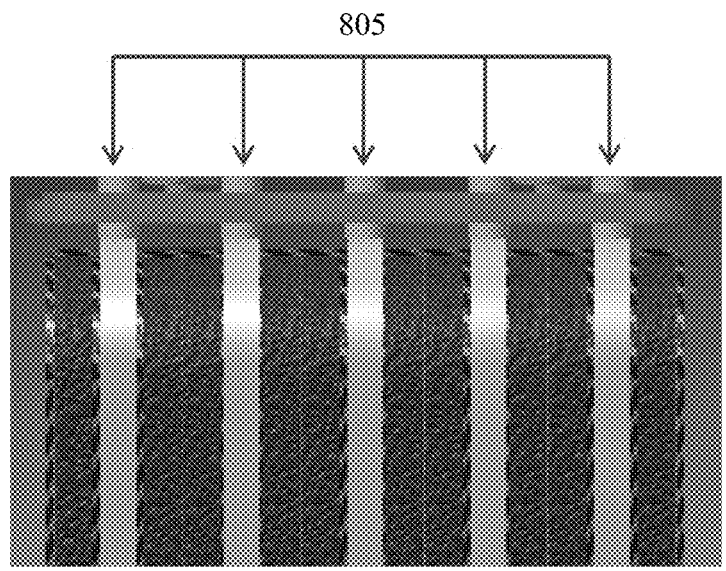
FIGS. 8A and 8B illustrate an energy storage device of the present disclosure containing more than one bi-cell.
Figure 8B:
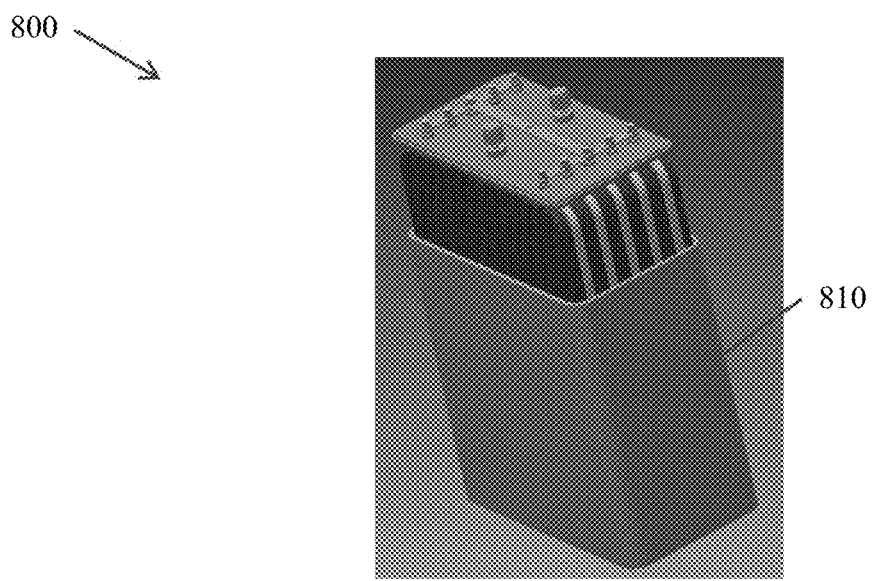

In some embodiments, the energy storage devices of the present disclosure may contain more than one bi-cell 805, as illustrated in FIG. 8A and FIG. 8B. For example, a housing 810 having a cubic shape with a larger internal volume may contain multiple individual bi-cells 805 that can be stacked to create a cell with higher capacity. In FIG. 8A and FIG. 8B, an energy storage device 800 including five bi-cells a stack configuration is illustrated.

Figure 9:
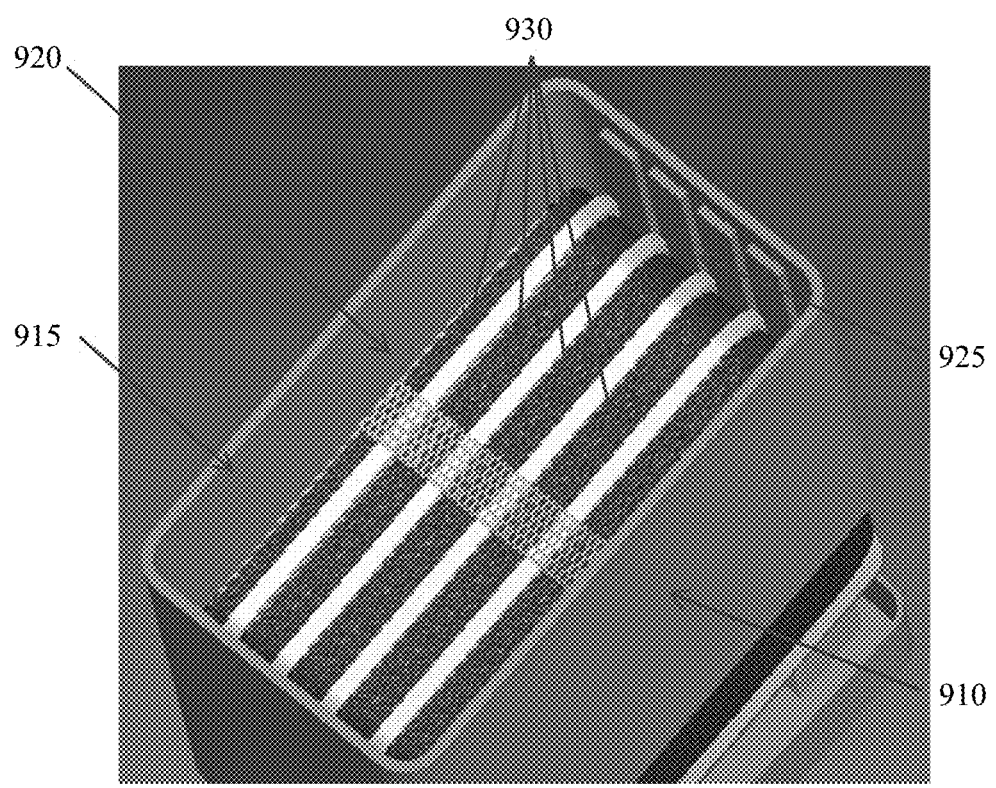
FIG. 9 illustrates a housing suitable to contain one or more of the energy storage devices of the present disclosure.

FIG. 9 illustrates how the energy storage device of FIGS. 8A and 8B may include a housing (or case) 910 having an interior surface 915 defining a region 920 (or volume) where a rib structure 925 is molded into the interior surface 915 of the housing (or case) 910, which allows each anode module 930 to slide into the housing (or case) 910 and to be supported during sealing.

Figures 10A, 10B:
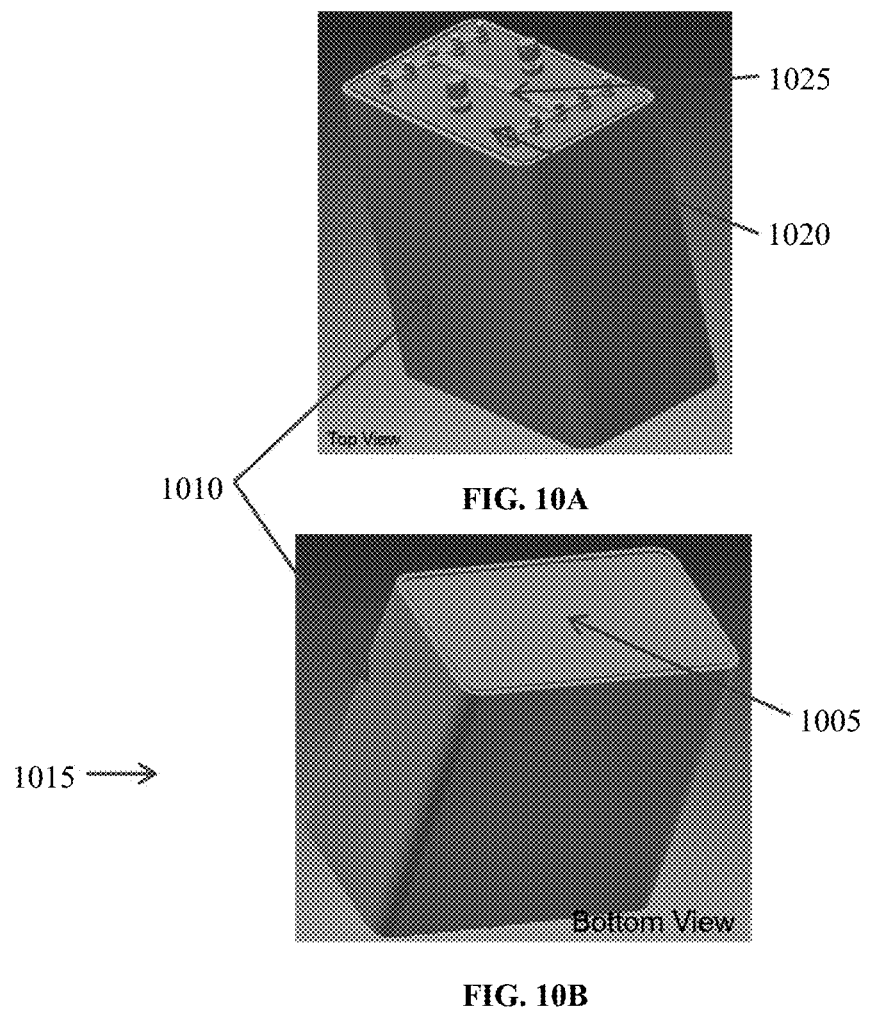
FIGS. 10A-10C illustrate housing configurations and components suitable to contain one or more of the energy storage devices of the present disclosure.
Figure 10C:
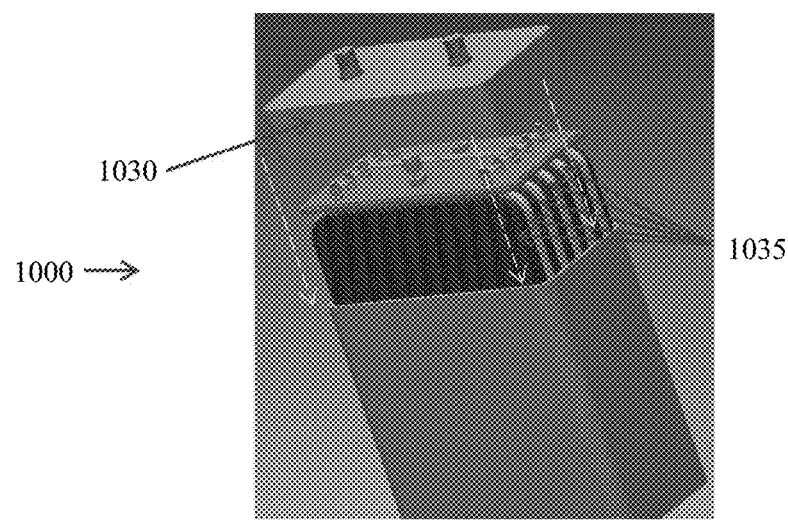

As illustrated in FIGS. 10A to 10C, a bottom lid 1005 may be sealed (by known methods) onto the case 1010 to close the housing 1015, and the bi-cells 1020 may be connected by known methodology, such as with bus bars 1025. Subsequently, the energy storage device 1000 can be filled with a secondary electrolyte, and optionally an additional cover 1030 may be sealed in place over the bus bars 1025, which provides a secondary hermetic seal. FIGS. 10A to 10C illustrate an energy storage device 1000 (about 5.25 in (width)×about 5.5 in (height)×about 3 in (thickness)) including a stack of 5-bi-cells 1035 (39 Ah×5 unit cells=195 Ah). In such an energy storage device, the surface area of the ion-conducting material (BASE) present on the anode module is about 1,519 cm$^2$.

In some embodiments, the anode module may be connected to the lid of the energy storage device housing (or case) in a manner that allows the case to be fabricated of stainless steel versus expensive controlled expansion nickel alloys.

Figure 11:
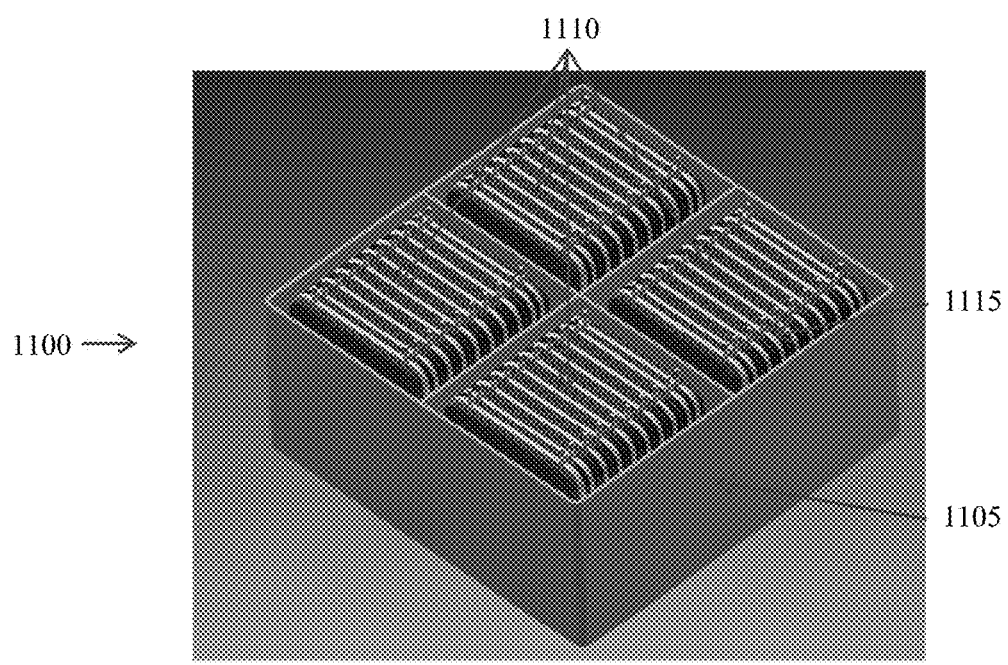
FIG. 11 illustrates an energy storage device in a multi-compartment housing suitable to contain one or more of the energy storage devices of the present disclosure.

In some embodiments, the energy storage device 1100 of the present disclosure may be configured such that the housing (or case) 1105 has two or more compartments 1110, such as illustrated in FIG. 11, which has four compartments 1110.

Each of the compartments 1110 of the energy storage device 1100 may include at least one anode module 1115, which may be a component of a bi-cell, disposed in the one or more compartments thereof, at least one anode module (which may be a component of a bi-cell) including an assembly that encloses an active anode material, such as an alkali metal (e.g., sodium, lithium, potassium, rubidium, cesium, or francium), in an anode reservoir. The energy storage device illustrated and housing of FIG. 11 includes a housing (or case) 1105 (12 in×12 in×6 in) having four compartments 1110, where each compartment 1110 contains a stack of 10 planar bi-cells (390 Ah; Total Capacity as shown: 1560 Ah; Power: 3.7 kWh) provides improved safety in the event of an anode module breach.

In embodiments, energy storage cell or device of the present disclosure can be utilized, operated, and/or discharged by known methodology generally used for alkali metal halide batteries (or sodium metal halide technologies) as describe in, for example, U.S. Pat. Application Publication Nos. 2013/0108912, 2013/0004828, 2012/0040230, and 2010/0068610, and U.S. Pat. Nos. 6,902,842, 6,329,099, 6,245,455, 5,763,117, 5,538,808, 5,196,277, 5,053,294, each of which are hereby incorporated by reference in their entireties. Briefly, the energy storage device, such as a metal halide battery or metal halide electrochemical cell, can include an anode including an anode module containing an electronically conductive material, such as sodium, that can pass through a surface ion-conducting material of the anode module under application of an electric field, and a cathode including an electrolyte mixed with a reactive metal, for example, an electrolyte formed of a molten salt, such as sodium tetrachloroaluminate, and a metal formed from nickel particles.

In some embodiments, the energy storage device, such as the above-described metal halide battery or metal halide electrochemical cell can be evacuated through a port in the top header and molten sodium tetrachloroaluminate may be back filled into the cell. Generally such an energy storage cell or device can be heated to a suitable temperature for operation, such as a temperature in a range of from about 180° C. to about 350° C., from about 260° C. to about 320° C., or from about 280° C. to about 300° C.

In embodiments in which the energy storage device can include a sodium-nickel/NaCl battery cell, the anode can include sodium, and the cathode can include nickel/NaCl. During charging, chloride ions are released from sodium chloride and combined with nickel to form nickel chloride. Sodium ions then migrate from the cathode through the ion-conducting layer into the anode reservoir. During discharge, the reverse chemical reaction occurs and sodium ions migrate from the anode reservoir through the separator into the cathode.

The energy storage devices of the present disclosure (and components thereof), such as alkali metal halide batteries or sodium metal halide batteries, can be used in a variety of applications, such as for example, automotive, electrical grid storage, renewable energy storage, transportation, personal safety, security, remote monitoring, law enforcement, utilities, metering, telecommunications, military, and aerospace applications. Specific advantages of this subject matter, such as increased safety, reliability, affordability, and scalability, make it particularly useful for stationary energy storage such as renewable energy capacity firming and electrical energy time-shifting for large, grid-scale uses to residential uses.

In embodiments, the present disclosure also relates to methods of forming an energy storage device, electrochemical cell or battery by preparing an anode module (as described above) containing an anode active material, and a current collector, the cathode and the anode active material being separated from each other by an ion conducting layer that coats the planar module and provides a path for ion transfer from the interior (i.e., the anode reservoir) of the anode module to the region of the device, cell, or battery containing the cathode (and cathode active material).

In one method of the present disclosure, an energy storage device including an anode module (as described above) containing an anode active material, and a current collector, the cathode and the anode active material being separated from each other by an ion conducting layer that coats the planar module and provides a path for ion transfer from the interior (i.e., the anode reservoir) of the anode module to the region of the device, cell, or battery containing the cathode (and cathode active material) is charged by (a) supplying electric energy at constant current; (b) monitoring voltage during the charging; and (c) terminating the charge when the monitored voltage is in the range of about 2.6 volts to about 2.9 volts. In some embodiments, the charge may be terminated when the monitored voltage is in the range of about 2.7 volts to about 2.8 volts. In some embodiments, the termination voltage may be in the range of from about 2.75 volts to about 2.8 volts. In some embodiments, charging may be performed by supplying constant current so as to charge the cell in about 1 to about 20 hours.

It should be understood that various principles of the disclosure have been described in illustrative embodiments. However, many combinations and modifications of the above described formulations, proportions, elements, materials, and components used in the practice of the claimed subject matter, in addition to those not specifically described, may be varied and particularly adapted to specific environments and operating requirements without departing from those principles. Other variations and modifications of the present disclosure will be apparent to those of ordinary skill in the art, and it is the intent that such variations and modifications be covered by this disclosure.

Further, the description of various embodiments herein makes reference to the figures, which show the embodiments by way of illustration and not of limitation. While these embodiments are described in sufficient detail to enable those skilled in the art to practice the claimed subject matter, it should be understood that other embodiments may be realized and that logical and mechanical changes (e.g., electrolyte compositions, cell components, and energy storage device configurations, etc.) may be made without departing from the spirit and scope of the claimed subject matter. Thus, the disclosure herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the claimed subject matter. The scope of the claimed subject matter is accordingly to be limited by nothing other than the claims that may be included in an application that claims the benefit of the present application, in which reference to an element in the singular is not intended to mean "one and only one" unless explicitly so stated, but rather "one or more." Moreover, where a phrase similar to "at least one of A, B, and C" may be used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Although certain embodiments may have been described as a method, it is contemplated that the method may be embodied as computer program instructions on a tangible computer-readable carrier and/or medium, such as a magnetic or optical memory or a magnetic or optical disk. All structural, chemical, and functional equivalents to the elements of the above-described embodiments that are known to those of ordinary skill in the art are contemplated within the scope of this disclosure.

Although the present subject matter is set forth herein in the context of the above drawing figures, it should be appreciated that the subject matter is not limited to the specific form shown. For example, while the disclosure is conveniently described in connection with particular anode materials, cathode materials, separator materials, and electrolytes, the present disclosure is not so limited. Furthermore, although the energy storage device (or alkali metal halide cell or battery) is described in connection with specific configurations, the subject matter is not limited to the illustrated exemplary configurations. Various modifications, variations, and enhancements in the design and arrangement of the method and apparatus set forth herein, may be made without departing from the spirit and scope of the present disclosure as set forth in the appended claims.

Having described the disclosure in detail above, it will be apparent that modifications and variations are possible without departing from the scope of the disclosure defined in the appended claims.

What is claimed is:

1. An alkali metal halide cell, comprising:
   an anode including at least one anode module, the at least one anode module including a porous planer assembly, the porous planar assembly including two porous rectangular shaped sheets, and a rectangular shaped ring situated intermediate and sealed to the two porous rectangular shaped sheets, the rectangular shaped ring including second inner surfaces, each of the porous rectangular shaped sheets including a first inner surface;

an anode reservoir defined by the first inner surface of each of the porous rectangular shaped sheets and the second inner surfaces of the rectangular shaped ring;

an active anode material disposed in the anode reservoir enclosed within the porous planar assembly, which is a planar module;

a layer of an ion-conducting material; and a cathode including an active cathode material; wherein:
the porous planar assembly includes two outermost surfaces,
each of the two outermost surfaces is located on the each of the porous, rectangular shaped sheets,
the layer of the ion-conducting material is deposited on each of the two outermost surfaces,
each of the layer of the ion-conducting material and the porous planar assembly extends along at least an entire width and an entire length of the cathode to allow the passage of ions between the anode reservoir and the cathode, and to impede the direct passage of electrons between an inner surface of each of the porous, rectangular shaped sheets and a third outer surface of the ion conducting material, which separate the active anode material from the cathode,
the anode reservoir includes a thickness from about 5 mm to about 30 mm,
the rectangular shaped ring includes a thickness from about 0.2 cm to about 3 cm,
the anode reservoir includes a volume from about 5 $cm^3$ to about 2700 $cm^3$, and
a first coefficient of thermal expansion value of the ion-conducting material matches a second coefficient of thermal expansion value of the planar module.

2. The alkali metal halide cell of claim 1, wherein the cathode includes pores, the majority of pores are within a range of from about 0.5 μm to about 500 μm in size.

3. The alkali metal halide cell of claim 1, at least one of the two porous rectangular shaped sheets, which is comprised of one of a sintered metal and foam, are attached to a metal frame.

4. The alkali metal halide cell of claim 3, wherein the metal frame comprises at least one of stainless steel, nickel, and controlled-expansion alloys.

5. The alkali metal halide cell of claim 1, wherein at least one said third outer surface contacts the cathode material, and wherein the at least one said third outer surface is coated with an electronic insulator.

6. The alkali metal halide cell of claim 1, wherein the ion-conducting layer comprises a solid electrolyte material.

7. The alkali metal halide cell of claim 1, wherein the ion-conducting layer has a thickness of from about 10 μm to about 500 μm.

8. The alkali metal halide cell of claim 1, wherein the ion-conducting layer comprises at least one of sodium β"-alumina, NASICON, and glass.

9. The alkali metal halide cell of claim 1, wherein the ion-conducting layer comprises a β"-alumina solid electrolyte (BASE).

10. The alkali metal halide cell of claim 1, wherein the ion-conducting layer has a surface area of from about 50 $cm^2$ to about 1800 $cm^2$.

11. The alkali metal halide cell of claim 1, wherein the active anode material comprises sodium.

12. The alkali metal halide cell of claim 1, wherein the active cathode material comprises a metal halide.

13. The alkali metal halide cell of claim 12, wherein the metal halide is at least one of $NiCl_2$, and $FeCl_2$.

14. The alkali metal halide cell of claim 1, wherein the active cathode material includes a secondary electrolyte.

15. The alkali metal halide cell of claim 14, wherein the secondary electrolyte is sodium tetrachloroaluminate.

16. The alkali metal halide cell of claim 1, wherein the active cathode material is disposed in a sodium tetrachloroaluminate melt.

17. The alkali metal halide cell of claim 1, wherein the cathode comprises the active cathode material in an amount from 60% to 99% by weight of the cathode.

18. A battery, comprising: at least one alkali metal halide cell of claim 1 being disposed in a housing including at least one compartment.

19. The battery of claim 18, wherein the housing comprises stainless steel.

20. The battery of claim 18, wherein the housing comprises a lid.

21. The battery of claim 18, wherein the anode of the at least one alkali metal halide cell comprises at least one terminal secured in the lid with a sodium resistant glass preform.

22. The battery of claim 18, wherein the at least one alkali metal halide cell is a bi-cell.

23. The battery of claim 18, wherein the alkali metal halide cell is a bi-cell, and at least two of the bi-cells are disposed in the housing.

24. The battery of claim 18, wherein the housing comprises at least two compartments and, in each of the at least two compartments, at least two of the bi-cells are disposed.

25. The battery of claim 18, wherein the housing has an internal volume from about 800 $cm^3$ to about 15,000 $cm^3$.

26. The alkali metal halide cell of claim 1, wherein the porous rectangular shaped sheet is comprised of one of a sintered metal material and a foam material.

27. The alkali metal halide cell of claim 1, wherein the porous rectangular shaped sheet is comprised of a non-metal polymeric material.

* * * * *